US012025593B2

(12) United States Patent
Hill et al.

(10) Patent No.: US 12,025,593 B2
(45) Date of Patent: Jul. 2, 2024

(54) SAMPLE INJECTION FOR LIQUID CHROMATOGRAPHY USING SPLIT SOLVENT FLOW

(71) Applicant: Waters Technologies Corporation, Milford, MA (US)

(72) Inventors: Jason F. Hill, Milford, MA (US); Sylvain Gilles Cormier, Mendon, MA (US); Martin Gilar, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 618 days.

(21) Appl. No.: 17/095,280

(22) Filed: Nov. 11, 2020

(65) Prior Publication Data

US 2021/0156826 A1    May 27, 2021

Related U.S. Application Data

(60) Provisional application No. 62/939,891, filed on Nov. 25, 2019.

(51) Int. Cl.
*G01N 30/20* (2006.01)
*G01N 30/10* (2006.01)
(Continued)

(52) U.S. Cl.
CPC .............. *G01N 30/20* (2013.01); *G01N 30/10* (2013.01); *G01N 30/34* (2013.01);
(Continued)

(58) Field of Classification Search
CPC ........ G01N 30/20; G01N 30/10; G01N 30/30; G01N 30/32; G01N 30/34;
(Continued)

(56) References Cited

U.S. PATENT DOCUMENTS 6,790,361 B2   9/2004  Wheat et al.
9,823,225 B2   11/2017 Cormier et al.
(Continued)

FOREIGN PATENT DOCUMENTS

EP   0544988 A1   6/1993
GB   1084952 A    9/1967
(Continued)

OTHER PUBLICATIONS

International Search Report and Written Opinion in PCT/US2020/05982 dated Apr. 30, 2021.
(Continued)

*Primary Examiner* — Benjamin L Lebron
(74) *Attorney, Agent, or Firm* — Schmeiser, Olsen & Watts LLP; William G. Guerin (57) ABSTRACT

Described herein are a selectable flow restriction device and a fluidic network for chromatographic sample dilution during injection. A selectable flow restriction device is used in combination with a splitter to define an adjustable splitter for separating a high-pressure solvent flow into two separate solvent flows having the same solvent composition. The first solvent flow passes to a sample manager where a sample is injected as a discrete fluidic plug at an injection valve into a flow comprising at least one solvent. The second solvent flow is merged downstream from the location of injection with the first solvent carrying the sample fluidic plug. The second solvent flow dilutes the sample plug during the mixture of the two solvent flows.

14 Claims, 9 Drawing Sheets

(51) Int. Cl.
*G01N 30/30* (2006.01)
*G01N 30/34* (2006.01)
*G01N 30/02* (2006.01)

(52) U.S. Cl.
CPC . *G01N 2030/027* (2013.01); *G01N 2030/201* (2013.01); *G01N 2030/202* (2013.01)

(58) Field of Classification Search
CPC ....... G01N 2030/027; G01N 2030/201; G01N 2030/202; G01N 2030/207; G01N 2030/208
See application file for complete search history.

(56) References Cited

U.S. PATENT DOCUMENTS

2012/0305464 A1* 12/2012 Cormier ................ G01N 30/20
 137/1
2013/0067997 A1* 3/2013 Ebsen .................... G01N 30/20
 73/61.55
2014/0100682 A1 4/2014 Bongiovi
2017/0343518 A1* 11/2017 Thielsch ................ G01N 30/06

FOREIGN PATENT DOCUMENTS

WO 2014085003 A2 6/2014
WO 2015183290 A1 12/2015

OTHER PUBLICATIONS

Invitation to Pay Additional Fees in PCT/US2020/059982 dated Mar. 4, 2021.
Loos, et al. "Restriction capillaries as an innovative mixing unit for intermediate mobile phase exchange in multidimensional analysis," Journal of Chromatography A, vol. 1497, May 12, 2017, pp. 70-80.
International Preliminary Report on Patentability in PCT/US2020/059982 dated Jun. 9, 2022.

* cited by examiner

SAMPLE INJECTION FOR LIQUID CHROMATOGRAPHY USING SPLIT SOLVENT FLOW

RELATED APPLICATION

This application claims the benefit of the earlier filing date of U.S. Provisional Patent Application Ser. No. 62/939,891, filed Nov. 25, 2019 and titled "Sample Injection for Liquid Chromatography Using Split Solvent Flow," the entirety of which is incorporated herein by reference.

FIELD OF THE INVENTION

The technology generally relates to liquid chromatography. More particularly, the technology relates to a method and system for diluting a chromatographic sample in a liquid chromatography system using a split solvent flow.

BACKGROUND

Liquid chromatography systems sometimes require the dilution of a sample before the sample is injected into the mobile phase flowing to a chromatography column. For example, the sample may be dissolved in a strong solvent that may interact with the mobile phase and negatively affect chromatography. Normally, it is desirable to focus the sample at the head of the chromatographic column; however, strong solvents can prevent at least some of the sample from being retained at the head of the column, leading to peak broadening, peak distortion or sample breakthrough.

Sample dilution can be performed manually by a skilled technician; however, it is not always practical for a technician to be available. In many instances, the technician and equipment for performing dilutions are located at an inconvenient distance from the liquid chromatography system, resulting in significant delay. Moreover, there exist the risks of contamination and human error in the dilution process. In addition, the additional inconvenience of tracking transported samples is often necessary.

SUMMARY

In one aspect, a selectable flow restriction device includes a restriction valve and a plurality of flow restrictors. The restriction valve has a first port, a second port, a plurality of fluidic nodes and a movable valve channel. The channel has a first end fluidically coupled to the second port and a second end configured to couple to a selected one of the fluidic nodes. One of the first and second ports is an inlet port and the other of the first and second ports is an outlet port.

Each of the flow restrictors may include a fluidic channel having a diameter that is different from the diameter of each of the other fluidic channels of the other flow restrictors. Each of the flow restrictors may include a fluidic channel having a cross-sectional area that is different from the cross-sectional area of each of the other fluidic channels of the other flow restrictors.

The restriction valve may be a rotary valve.

Each of the fluidic nodes may be an external port. Alternatively, each of the fluidic nodes may be an internal node and each flow restrictor may be a fluidic channel formed inside the restriction valve between two of the fluidic nodes.

In another aspect, a fluidic network for chromatographic sample dilution during injection includes a flow splitter, an injection valve, a first flow combiner and a second flow combiner. The flow splitter has an inlet port, a first outlet port and a second outlet port. The flow splitter divides an inlet flow received at the inlet port into a first outlet flow at the first outlet port and a second outlet flow at the second outlet port. The injection valve has a plurality of injection valve ports. One of the injection valve ports is an inlet port coupled to the first outlet port of the flow splitter and another one of the injection valve ports is an outlet port. The first flow combiner has an inlet port coupled to the second outlet port of the flow splitter and has a second inlet port and an outlet port. The second flow combiner has a first inlet port coupled to the outlet port of the first flow combiner, a second inlet port coupled to the outlet port of the injection valve and an outlet port.

The flow splitter may be manually adjustable to control a split ratio. The flow splitter may have a split ratio that is responsive to a signal from a flow meter.

The fluidic network may further include a chromatographic column having an inlet port in fluidic communication with the outlet port of the second flow combiner.

In yet another aspect, a fluidic network for chromatographic sample dilution during injection includes a restriction valve, a plurality of flow restrictors, an injection valve, a first flow splitter and a first flow combiner. The restriction valve has a first port, a second port, a plurality of fluidic nodes and a movable valve channel. The channel has a first end fluidically coupled to the second port and a second end configured to couple to a selected one of the fluidic nodes. One of the first and second ports is an inlet port and the other one of the first and second ports is an outlet port. Each of the flow restrictors has a first end coupled to one of the fluidic nodes and a second end to another one of the fluidic nodes. The flow restrictors are arranged to form a serial path defined from a first one of the flow restrictors to a last one of the flow restrictors. A fluidic path to conduct a liquid is defined between the first port and the second port and the flow restrictors in the fluidic path are determined according to which one of the fluidic nodes is coupled to the second port. The injection valve has a plurality of injection valve ports. One of the injection valve ports is an inlet port and another one of the injection valve ports is an outlet port. The outlet port of the restriction valve is in fluidic communication with the inlet port of the injection valve. The first flow splitter has an inlet port, a first outlet port in fluidic communication with the inlet port of the restriction valve, and a second outlet port. The first flow combiner has a first inlet port coupled to the second outlet port of the first flow splitter, a second inlet port and an outlet port.

The fluidic network may further include a sample loop having a first end coupled to one of the valve ports of the injection valve and a second end coupled to another one of the valve ports of the injection valve.

The fluidic network may further include a second flow combiner. The second flow combiner may have a first inlet port coupled to the outlet port of the restriction valve, a second inlet port and an outlet port coupled to the inlet port of the injection valve, and the second inlet port of the first combiner may be coupled to the outlet port of the injection valve. The fluidic network may further include a chromatographic column having an inlet port in fluidic communication with the outlet port of the first flow combiner. Alternatively, the second flow combiner may have a first inlet port coupled to the outlet port of the first flow combiner, a second inlet port coupled to the outlet port of the injection valve and an outlet port, and the fluidic network may further include a chromatographic column having an inlet port in fluidic communication with the outlet port of the second flow combiner.

The restriction valve may be a first restriction valve, the plurality of restrictors may be a plurality of first restrictors and the fluidic network may further include a second restriction valve, a plurality of second flow restrictors, a second flow combiner and a second flow splitter. The second restriction valve has a first port, a second port, a plurality of fluidic nodes and a movable valve channel. The channel has a first end fluidically coupled to the second port and a second end configured to couple to a selected one of the fluidic nodes. One of the first and second ports is an inlet port and the other one of the first and second ports is an outlet port. Each of the second flow restrictors has a first end coupled to one of the fluidic nodes in the second restriction valve and a second end to another one of the fluidic nodes in the second restriction valve. The second flow restrictors are arranged to form a serial path defined from a first one of the second flow restrictors to a last one of the second flow restrictors and a fluidic path to conduct a liquid is defined between the first port and the second port of the second restriction valve through at least one of the second flow restrictors. The second flow restrictors in the fluidic path are determined according to which one of the fluidic nodes is coupled to the second port of the second restriction valve. The second flow combiner has a first inlet port coupled to the outlet port of the first restriction valve, a second inlet port coupled to the outlet port of the second restriction valve, and an outlet port coupled to the inlet port of the injection valve. The second flow splitter has an inlet port, a first outlet port coupled to the inlet port of the second restriction valve and a second outlet port coupled to the second inlet port of the first combiner. The fluidic network may further include a chromatographic column having an inlet port in fluidic communication with the outlet port of the first flow combiner.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to an "example" or "implementation" means that a particular feature, structure or characteristic described in connection with the example or implementation is included in at least one example or implementation of the teaching. References to a particular example or implementation within the specification do not necessarily all refer to the same example or implementation.

The mobile phase is a solvent or mixture of solvents used to carry a sample through the stationary phase of a liquid chromatography system. The mobile phase may be a gradient mobile phase in which the composition of the mobile phase changes with time. As used herein, the word "sample" refers to a sample solution that contains the sample components to be injected into the system flow of the liquid chromatography system. The sample is typically made available in a sample reservoir or sample container. The sample solution may also include a sample diluent.

As used herein, a solvent is sometimes referred to as a "strong solvent" or a "weak solvent" to indicate the relative elution strength of the solvent with respect to one or more other solvents. If the mobile phase is a strong solvent, the sample dissolved in the strong solvent will have a greater affinity for the mobile phase than the stationary phase. A strong solvent is generally capable of dissolving a greater quantity of a sample than a weak solvent; however, with the use of a strong solvent there may be a shorter retention time and little or no retention of the sample on the stationary phase. In contrast, if the mobile phase is a weak solvent, the sample dissolved in the weak solvent will have a greater affinity for the stationary phase than the mobile phase. As a result, sample components are better retained on the stationary phase and have longer retention times. By way of non-limiting examples for reversed phase chromatography, solvents composed primarily of methanol, acetonitrile, ethanol, isopropanol or tetrahydrofuran are typically considered strong solvents whereas water is generally considered a weak solvent. By way of non-limiting examples for normal phase chromatography and supercritical fluid chromatography, hexane and heptane are generally considered weak solvents, and methanol, ethanol and water are typically considered strong solvents.

In order for the stationary phase in the chromatographic column to preferentially retain sample components, the mobile phase is initially composed of a weak solvent of sufficiently low or moderate strength to prevent the sample components from simply passing through the column with little or no retention or separation. A gradient mobile phase gradually increases in strength over time to elute the sample components at different times.

In various applications, the sample may be provided in a solution that includes a strong diluent which may interfere with retention of the sample components on the stationary phase. To enable the sample components to be retained, or "focused," at the head of the chromatographic column, it is often desirable to further dilute the sample solution using a weaker solvent although the volume of the diluted sample is thereby increased. The use of the phrase "dilution ratio" is used herein to describe the degree, or amount, of the dilution and means a unit volume contribution of the sample with respect to the number of unit volumes contributed by the one or more diluents.

As used herein, a "splitter" or "flow splitter" means a component that is used to separate a received flow of a liquid into two or more flows each at a lesser volumetric flow rate (hereinafter generally referred to as "flow rate") than the flow rate of the received liquid. For a splitter separating an input flow into two separate output flows, "split" ratio means the ratio of the flow rate of one of the flows exiting the splitter to the other flow exiting the splitter. A "combiner" or "flow combiner" means a component that is used to combine two or more inlet flows into a single flow having a flow rate that is the sum of the flow rates of the inlet flows. A "tee" is a fluidic component that may be used as a splitter or a combiner. For example, for a tee having three ports and utilized as a splitter, a flow received at one port may exit as two separate flows from the other two ports. Conversely, the three-port tee may be utilized as a combiner where a flow is received at each of two ports and a single combined flow exits the tee at the third port. A "sample plug" means a discrete continuous portion of a fluid flow having a constant compositional characteristic. A flow restrictor means a component that provides a restriction to a fluid flow, such as a length of tubing having an inner diameter that, for a constant pressure, limits a flow rate of a conducted liquid. Alternatively, a flow restrictor can be a feature formed in a device that limits the flow of a liquid through the device. For example, the flow restrictor may be a channel formed inside a device where a diameter or cross-sectional area of the channel limits the flow of a liquid through the device. The term "coupled to" as used herein with fluidic components and fluidic networks means that the element, feature or components that are coupled to are fluidically coupled (i.e., in fluidic communication) or mechanically coupled so as to establish a fluidic pathway through the coupling.

In brief overview, examples disclosed herein are directed to a selectable flow restriction device and a fluidic network for chromatographic sample dilution during injection. A selectable flow restriction device is used in combination with a splitter to define an adjustable splitter for separating a high-pressure solvent flow into two separate solvent flows having the same solvent composition. The first solvent flow passes to a sample manager where a sample is injected as a discrete fluidic plug at an injection valve into a flow comprising at least one solvent. The second solvent flow is merged downstream from the location of injection with the first solvent carrying the sample fluidic plug. The second solvent flow dilutes the sample plug during the mixture of the two solvent flows. Thus, for a sample plug comprising a sample dissolved in a strong sample solvent, the second solvent flow dilutes the strong sample solvent in the sample plug before the sample plug arrives at the chromatographic column and peak broadening, peak distortion and sample breakthrough can be prevented.

Advantageously, no additional pumps for supplying a diluent are required as a solvent flow used for the mobile phase is also utilized for dilution. Moreover, the solvent split ratio may be adjusted to control the dilution ratio. In some implementations, a wide range of dilution ratios is realized through control of a fluidic valve to select one of several flow restriction paths.

The present teaching will now be described in more detail with reference to examples shown in the accompanying drawings. While the present teaching is described in conjunction with various examples, it is not intended that the present teaching be limited to such examples. On the contrary, the present teaching encompasses various alternatives, modifications and equivalents, as will be appreciated by those of skill in the art. Those of ordinary skill having access to the teaching herein will recognize additional implementations, modifications and examples, as well as other fields of use, which are within the scope of the present disclosure.

Figure 1:
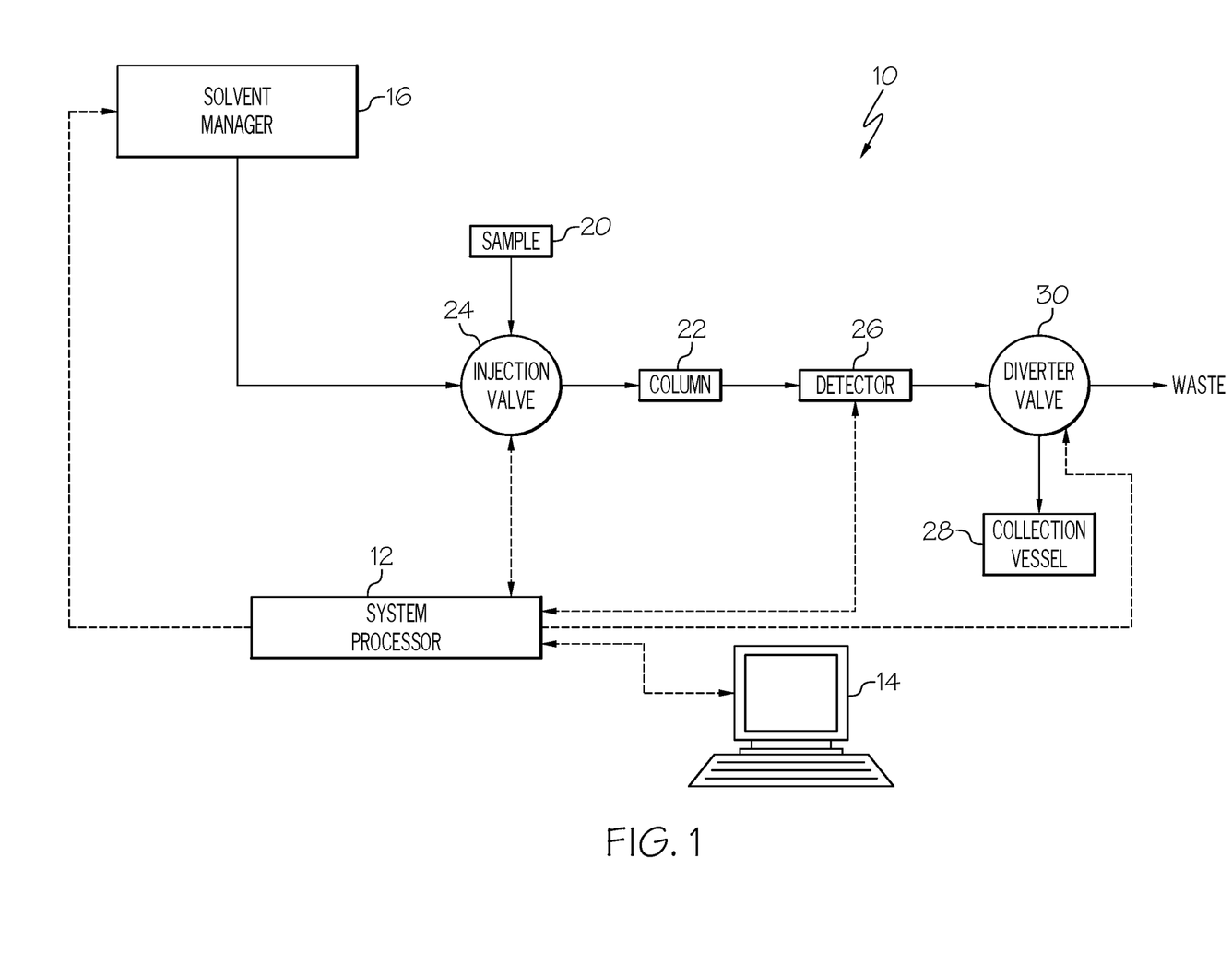
FIG. 1 is a block diagram of a liquid chromatography system that can include one of the examples of fluidic networks described herein for chromatographic sample dilution during injection.

FIG. 1 is a block diagram of a liquid chromatography system 10 that can be modified to practice embodiments of the method of the invention. The system 10 includes a system processor 12 (e.g., microprocessor and controller) in communication with a user interface device 14 for receiving input parameters and displaying system information to an operator. The system processor 12 communicates with a solvent manager 16 which provides one or more solvents for a mobile phase. For example, the solvent manager 16 may provide a gradient mobile phase. A sample from a sample source 20 is injected into the mobile phase upstream from a chromatographic column 22 at an injection valve 24. The sample source 20 can be a sample reservoir, vial or other container that holds a volume of the sample. In some instances, the sample source 20 provides a diluted sample that includes the sample and a diluent. The chromatographic column 22 is coupled to a detector 26 which provides a signal to the system processor 12. The signal is responsive to various components detected in the eluent from the column 22. After passing through the detector 26, the system flow exits to a waste port; however, when used for fraction collection, a diverter valve 30 is used to direct the system flow to one or more collection vessels 28.

Figure 2:
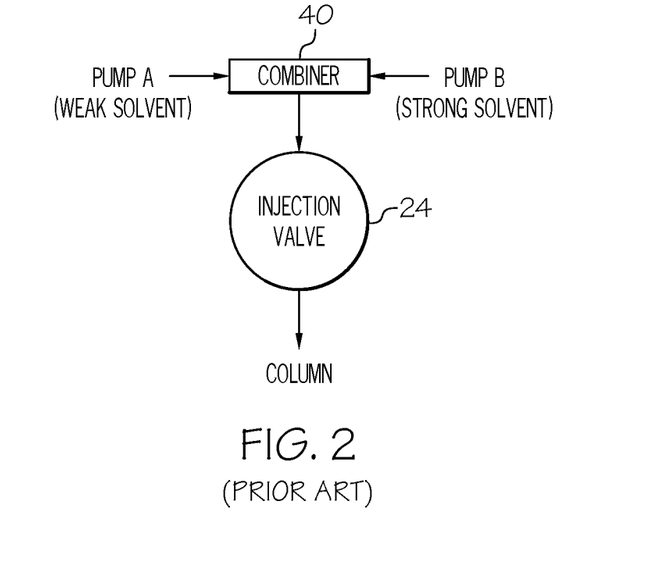
FIG. 2 is a schematic diagram illustrating conventional formation of a binary solvent used to perform a chromatographic separation.

FIG. 2 is a schematic diagram illustrating conventional formation of a binary solvent used to perform a chromatographic separation. A flow of a weak solvent (solvent A) from a first pump (pump A) and a flow of a strong solvent (solvent B) from a second pump (pump B) are combined into a single gradient mobile phase at a combiner (tee) 40. The flow rates of the two solvents A and B are controlled to achieve a desired solvent composition flowing to the injection valve 24. For a typical gradient mobile phase, the flow rate of one solvent is decreased while the flow rate of the other solvent is increased such that the solvent composition changes in time and the flow rate of the combined solvents remains constant. The injection valve 24 injects a sample plug into the combined solvent flow which flows to the chromatographic column.

As described above, the sample plug may include a strong solvent in which the sample is dissolved. When the sample plug arrives at the chromatographic column, the strong solvent may prevent loading of the sample at the head of the column and peak broadening, peak distortion or sample breakthrough may be evident in the chromatogram.

Figure 3:
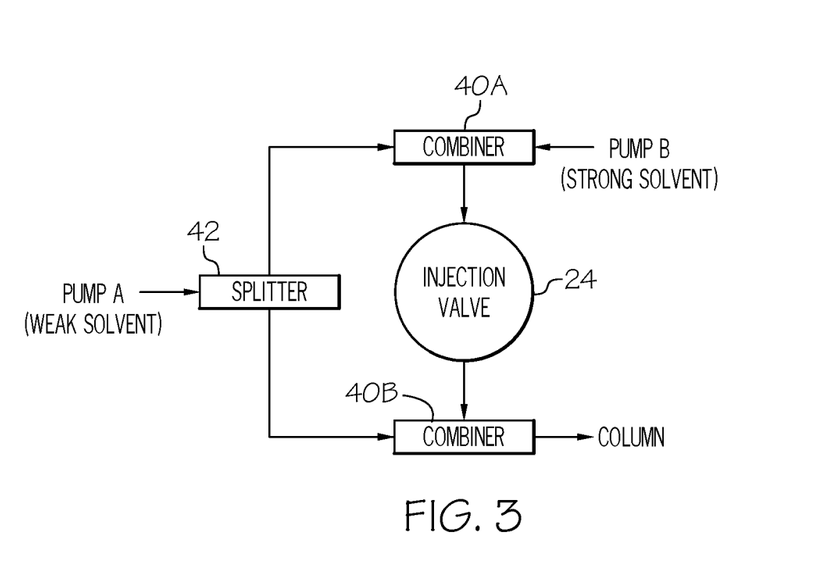
FIG. 3 is a schematic diagram illustrating an example of a fluidic network in which a weak solvent is split into two separate flows used for chromatographic sample dilution.

FIG. 3 is a schematic diagram illustrating an example of a fluidic network in which a weak solvent A is split at a splitter 42 into two separate flows: a first flow which is directed to a first combiner 40A and a second flow which is directed to a second combiner 40B. The first combiner 40A also receives a flow of a strong solvent B and provides a combined solvent flow to the injection valve 24 that, at the time of injection, pushes a sample plug, i.e., a known volume of sample and sample solvent, from a sample loop coupled to or formed in the injection valve 24. The sample plug is a discrete fluidic plug of the sample and sample solvent. The combined solvent flow from the injection valve 24 therefore includes a mixture of the solvents received at the combiner 40A along with the embedded sample plug. The second combiner 40B receives and merges the combined solvent flow from the injection valve 24 and the second flow from the splitter 42. The merged flow exits the second combiner 40B and flows to the chromatographic column. During the time that the sample plug embedded in the combined flow passes through the second combiner 40B, it is merged with the second flow of weak solvent from the splitter 42. Thus, the sample plug is diluted with the weak solvent.

The dilution ratio for the sample plug is determined according to the flow rates of the combined solvent flow from the injection valve 24 and the second flow of the weak solvent. Stated otherwise, the dilution ratio is determined by the split ratio defined for the first and second flows from splitter 42. For example, an increase in the second flow of weak solvent from the splitter 42 results in an increased dilution of the sample plug. The increase in the dilution ratio occurs because more weak solvent is merged with the sample plug per unit time and because the first flow is decreased thereby making the sample plug move more slowly through the second combiner 40B.

The flow rates of the first and second flows can be controlled using capillaries or tubing having fixed flow restrictions. For a particular configuration, the flow restriction of one or both fluidic paths conducting liquid from the splitter 42 can be manually adjusted, changed or replaced to control the desired split ratio for a subsequent separation. Conversely, a specific split flow ratio can be selected by applying a selectable flow restriction to one of the flow paths. This selection can be implemented by using a restriction valve that can switch between discrete restriction values, as described in more detail below. In one example, the restriction valve may be controlled by a feedback signal generated by a flow meter disposed in one of the fluidic paths conducting flow from the splitter 42. This feedback control of a restriction valve may be implemented in other examples of fluidic networks described below.

Figure 4:
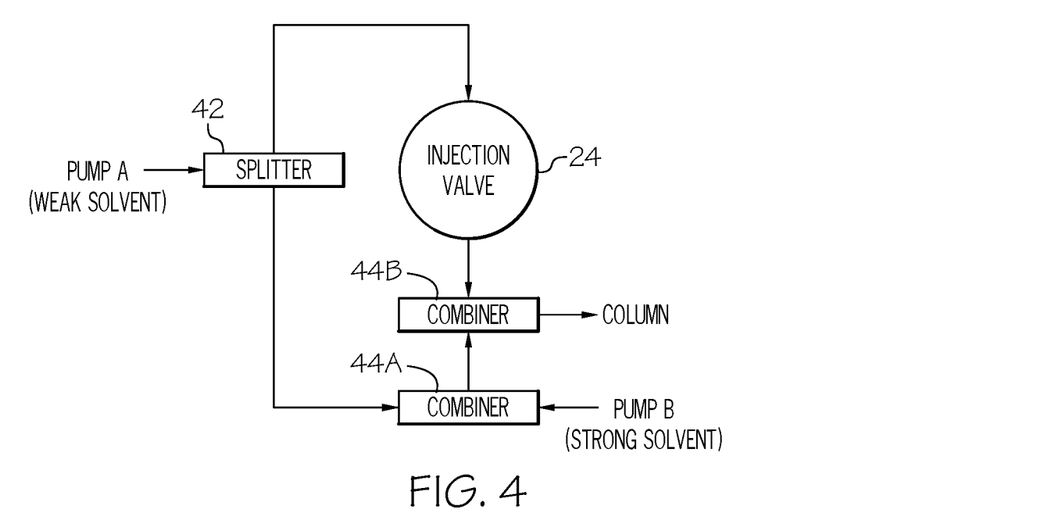
FIG. 4 is a schematic diagram illustrating another example of a fluidic network in which a weak solvent is split into two separate flows used for chromatographic sample dilution.

FIG. 4 is a schematic diagram illustrating an example of a fluidic network in which the weak solvent A is split at a splitter 42 into two separate flows as described above with respect to the configuration shown in FIG. 3; however, instead of merging the flow of strong solvent B with the first flow going to the injector valve 42, the strong solvent is merged with the second flow at a first combiner 44A to create a first merged flow. Only the first flow of weak solvent A is used to push the sample plug from the injection valve 24. A second combiner 44B receives the first flow of weak solvent containing the sample plug from the injection valve 24 and the merged flow of weak and strong solvents A and B, respectively, from the first combiner 44A, and creates a second merged flow which flows to the chromatographic column. During the time that the sample plug embedded in the first flow from the injection valve 24 passes through the second combiner 44B, it is diluted by the combination of weak and strong solvents A and B, respectively, in the flow from the first combiner 44A.

The dilution of the sample plug is determined according to the flow rate of the first flow of weak solvent A and the flow rate of the first merged flow from the first combiner 44A. Thus, the dilution of the sample plug is determined by the split ratio defined for the first and second flows from splitter 42. Although the dilution of the sample plug achieved with the fluidic network of FIG. 4 may be the same as that realized with the fluidic network of FIG. 3, that is, the volumes of solvent added to a sample plug during merging for both configurations may be identical, the resulting chromatograms may be different. This difference may be due to the difference in the solvent strength of the diluting solvents.

Figure 5:
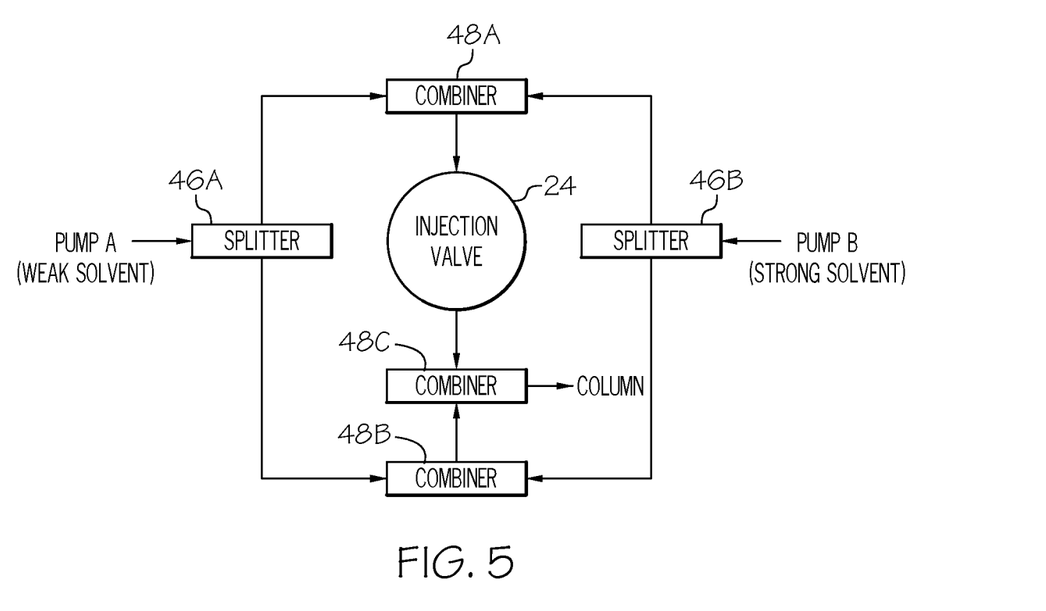
FIG. 5 is a schematic diagram illustrating an example of a fluidic network for dilution of a chromatographic sample wherein the network splits a weak solvent into two separate flows and splits a strong solvent into two separate flows.

FIG. 5 is a schematic diagram illustrating another example of a fluidic network for dilution of a sample. In this configuration, a flow of a weak solvent A is separated at a splitter 46A into a first weak solvent flow and a second weak solvent flow. Similarly, a flow of a strong solvent B is separated at a splitter 46B into a first strong solvent flow and a second strong solvent flow. The first weak solvent flow and first strong solvent flow are combined at a first combiner 48A into a first merged flow that is received at the injection valve 24. The second weak solvent flow and the second strong solvent flow are combined at a second combiner 48B into a second merged flow. The injection valve 24 injects a sample plug into the first merged flow which passes to a third combiner 48C. The second merged flow is also received at the third combiner 48C which merges the first and second merged flows into a third merged flow which flows to the chromatographic column. During the time that the sample plug embedded in the first merged flow from the injection valve 24 passes through the third combiner 48C, it is diluted by the combination of weak and strong solvents A and B, respectively, in the second merged flow from the second combiner 48B.

The dilution of the sample plug is determined according to the flow rates of the first and second flows of weak solvent A and the first and second flows of strong solvent B. Thus, the dilution of the sample plug is determined by the split ratios implemented by the two splitters 46A and 46B. The improvement in a chromatographic separation performed with the illustrated configuration depends on the elution strength of the solvents therefore the chromatograms for two separations using an identical sample may be different if different solvents are used even though the dilution ratios may be identical.

Figure 6:
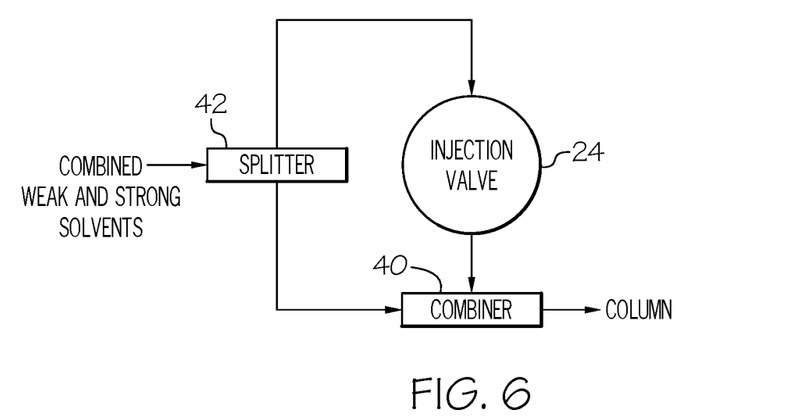
FIG. 6 is a schematic diagram illustrating another example of a fluidic network in which a mobile phase is split into two separate flows used for chromatographic sample dilution.

FIG. 6 is a schematic diagram shows an alternative example of a fluidic network for diluting a sample. This configuration is structurally less complex compared to those described above and includes a single splitter 42 and a single combiner 40. In this case, the weak and strong solvents A and B, respectively, are combined upstream from the splitter 42 into a binary gradient mobile phase. The starting composition of the mobile phase is a weak solvent therefore a sample plug containing a sample in a strong sample diluent is still diluted to a weaker sample plug using this split flow configuration.

Figure 7:
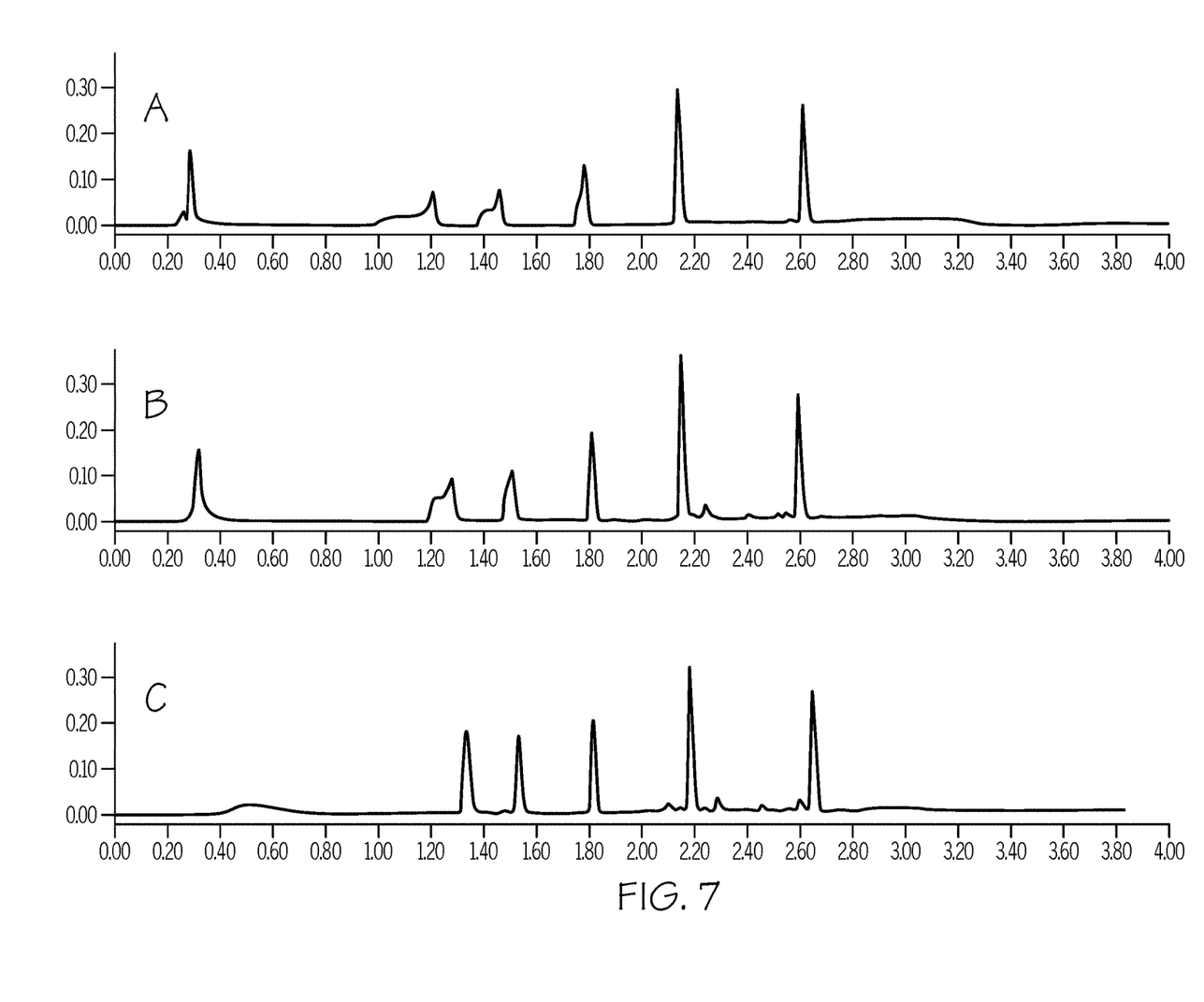
FIG. 7 shows chromatograms obtained for three different chromatographic separations of a sample performed with a system having a fluidic network as shown in FIG. 5.

FIG. 7 shows three chromatograms A, B and C obtained for three different chromatographic separations of a sample performed with a system having a fluidic network such as that shown in FIG. 5. Each chromatogram shows the detector response to the presence of five sample analytes: (1) acetanilide, (2) Courmarin, (3) Benzoin, (4) 1,1-bi-2-naphtol and (5) dibutyl thphalate. The three separations were performed with an ACQUITY UPLC™ 2.1 mm×50 mm, 1.7 μm BEH C18 column available from Waters Corporation of Milford, Massachusetts The mobile phase flow rate was 0.5 mL/min and the column temperature was maintained at 40° C. The binary mobile phase was water and acetonitrile with a linear gradient that transitioned from 5% acetonitrile to 95% acetonitrile in 2.5 minutes.

The first chromatogram A exhibits severe peak distortion causes by the strong solvent in the sample plug. The second chromatogram B used a split flow adjusted to achieve a dilution of 2.22 times the programmed injection volume. The third chromatogram C used a split flow adjusted to achieve a dilution of eight times the programmed injection volume. It can be seen that the greater dilution produced the chromatogram with the least peak distortion.

Figure 8:
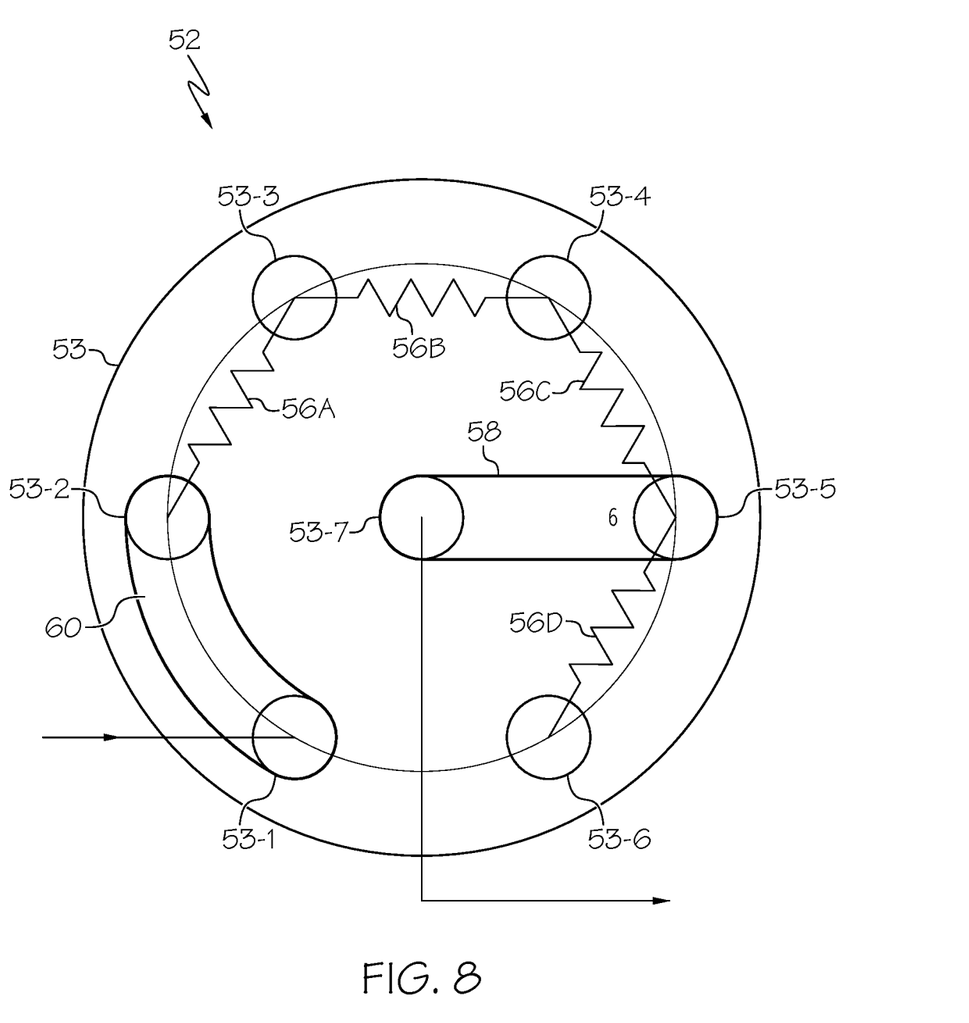
FIG. 8 is a schematic diagram of an example of a selectable flow restriction device.

FIG. 8 is a schematic diagram of a selectable flow restriction device 52. The device includes a restriction valve 53 that can be used in conjunction with a fluidic tee as a flow splitter having an adjustable split ratio. For example, the splitter 42 in FIG. 3 can be implemented as a fluidic tee with one of the outlet flows directed through the device 52. The valve 53 can be operated in different valve states where each state achieves a different split ratio.

The restriction valve 53 may be implemented as a rotary valve; however, in other implementations, the valve 53 may be any other controllable valve that allows an input flow to be directed through two or more fluidic paths within the valve 53. The valve 53 includes an inlet port 53-1 and an outlet port 53-7. Four discrete flow restrictors 56A to 56D are shown. The flow restrictors 56 can be externally coupled to the valve 53 through fluidic nodes 53-2 to 53-6 where each node is an external port to which an end of a flow restrictor 56 can be coupled. In alternative examples, one or more of the fluidic nodes may be an internal node, that is, a node that is not directly accessible at an external port. In the illustrated example, the inlet port 53-1 is directly coupled to fluidic node 53-2 through an internal valve channel such as a channel 60 in a stator of the rotary valve. In one example, each flow restrictor 56 is a length of tubing coupled at its ends to a pair of external ports. The inner diameters of the tubing may differ to provide different values of flow restriction. Alternatively, the flow restrictors 56 can be internal to the valve 53. For example, the flow restrictors 56 can be internal fluidic paths formed in the valve body that terminate at each end at one of the fluidic nodes 53-2 to 53-6. The cross-sectional area of the internal fluidic paths may differ to provide different values of flow restriction. The valve 53 includes a movable valve channel 58 which provides a radial fluidic path between the outlet port 53-7 and one of the fluidic nodes 53-2 to 53-6. The movable valve channel 58 rotates clockwise or counterclockwise about one end at outlet port 53-7 so that the other end is coupled to one of the fluidic nodes.

The flow restrictors 56 are arranged in a serial path defined from a first one of the restrictors 56A to a last one of the restrictors 56D. A selectable flow restriction is added to the solvent flow path by configuring the valve 53 so that the radial fluidic path 58 couples port 53-7 to one of ports 53-3, 53-4, 53-5 and 53-6 to achieve flow restrictions defined by restrictor 56A, 56A through 56B, 56A through 56C, and 56A through 56D, respectively. Thus, a fluidic path to conduct a liquid is defined between the inlet port 53-1 and the outlet port 53-7 where the flow restrictors 56 included in the fluidic path are determined according to which one of the fluidic nodes 53-2 to 53-6 is coupled to the outlet port 53-7. As illustrated, a solvent flow received at the inlet port 53-1 passes through the stator channel 60 to node 53-2 and then through flow restrictors 56A, 56B and 56C before passing from fluidic node 53-5 through the movable valve channel 58 and exits through the outlet port 53-7.

The flow restriction may be selected based on the desired dilution for the sample upon injection into the mobile phase of the liquid chromatography system. In some implementations, the flow restrictions for the four restrictors 56 are chosen so that the difference between the minimum restriction and the maximum restriction is an order of magnitude although in certain implementations the difference may exceed two orders of magnitude.

Figure 9:
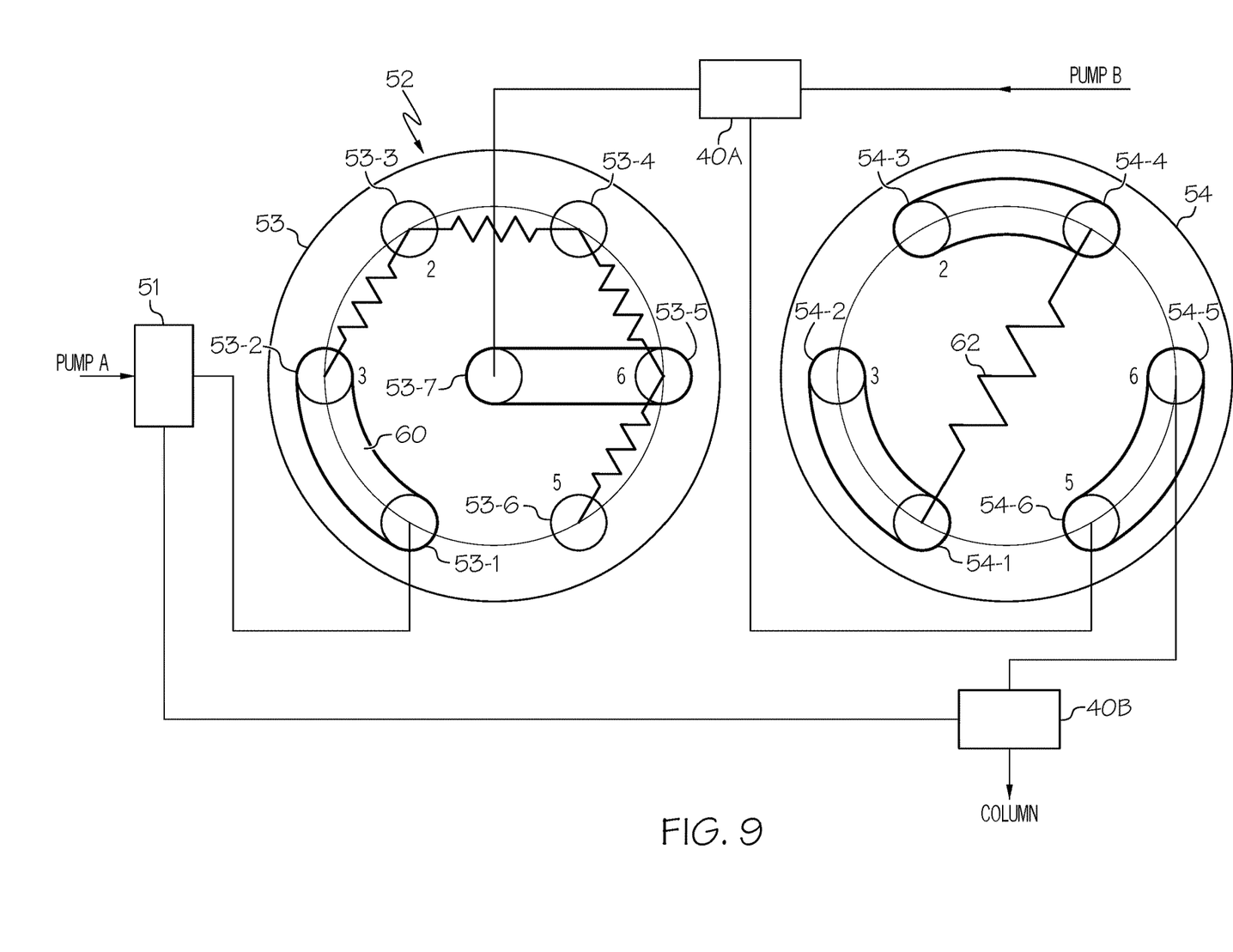
FIG. 9 is a schematic diagram of an example of a fluidic network having an adjustable flow restriction device.

FIG. 9 is a schematic diagram of an example of a fluidic network having an adjustable flow restriction device 52. The network can be used to implement the configuration shown in FIG. 3 and includes a rotary valve 53 and an injection valve 54. The serial arrangement of a fluidic tee 51 and the adjustable flow restriction device 52 corresponds to the splitter 42 of FIG. 3 where the split ratio for the received solvent flow is adjustable and determined by the state of the injection valve 53. The injection valve 53 corresponds to the valve 24 of FIG. 3.

The injection valve 54 is shown as a rotary valve, such as a rotary shear seal valve, and includes six ports 54-1 to 54-6. A sample loop 62 is shown coupled at one end to port 54-1 and at the other end to port 54-6. The sample loop 62 holds a fixed volume of sample and any sample diluent awaiting injection into the mobile phase of the chromatography system. The injection valve 54 is shown in a first valve state in which port 54-1 is coupled to port 54-2, port 54-3 is coupled to port 54-4 and port 54-5 is coupled to port 54-6. The valve may be switched into a second valve state, for example, for injecting the sample into the mobile phase, in which ports 54-1 is coupled to port 54-6, port 54-2 is coupled to port 54-3 and port 54-4 is coupled to port 54-5. Although not shown, ports 54-2 and 54-3 may be coupled to additional fluidic paths that may be used to load the sample into the sample loop when the injection valve 54 is in the first valve state, as illustrated.

According to the illustrated network, one outlet of the fluidic tee 51 is coupled to port 53-1 of valve 53. The outlet port 53-7 of valve 53 is coupled to one of the inlets of a first combiner 40A. Ports 54-6 and 54-5 of the injection valve 54 to the outlet of the first combiner 40A and an inlet of a second combiner 40B. The second outlet of the fluidic tee 51 is coupled to a second inlet of the second combiner 40B. In this arrangement, the flow of strong solvent from Pump B is mixed with a split portion of the weak solvent from Pump B at the first combiner 40A and used to push the sample stored in the sample loop 62 from the injection valve 54. The sample leaving the sample loop 62 is diluted at the second combiner 40B with the other split portion of the weak solvent.

Figure 10:
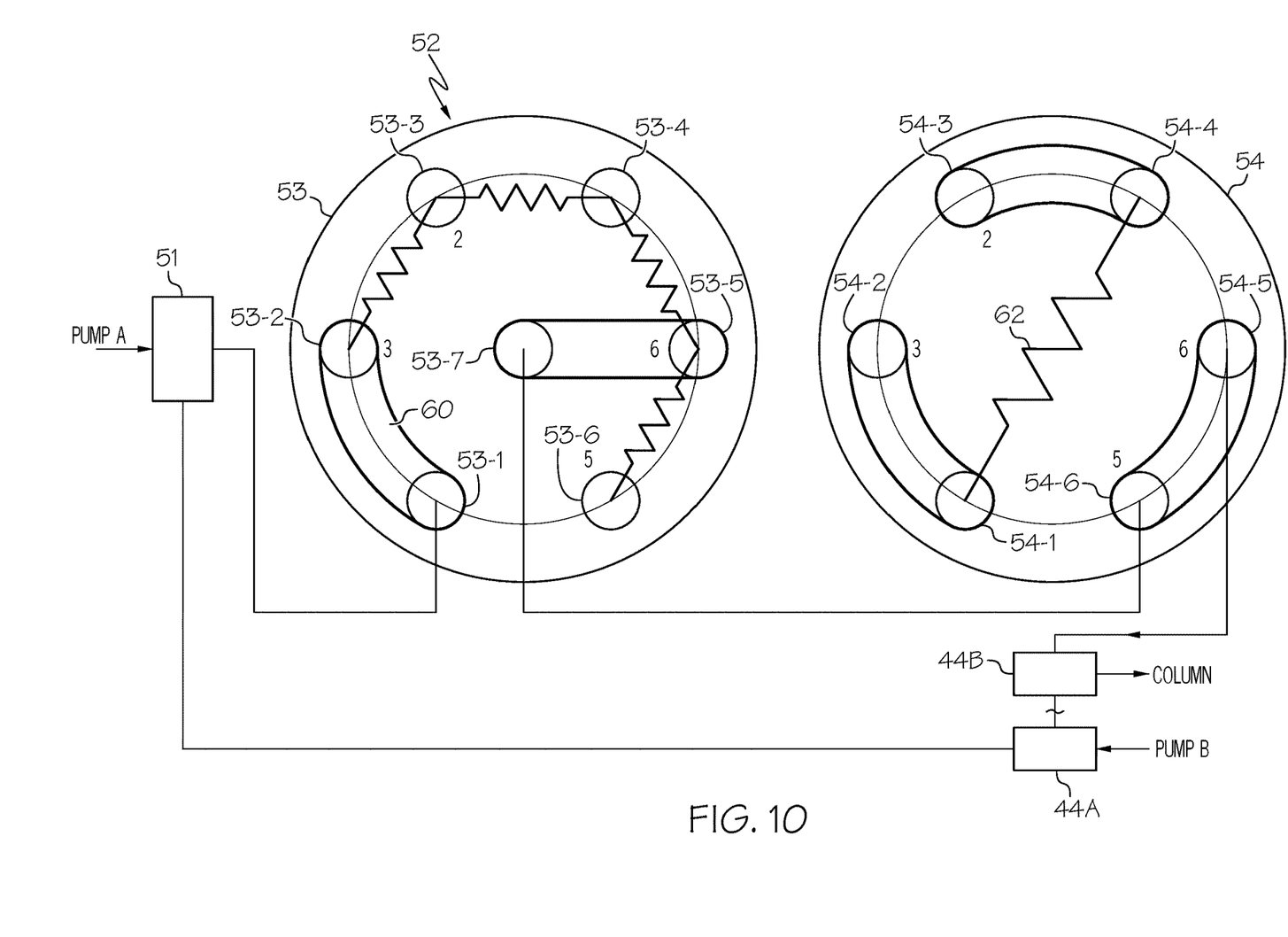
FIG. 10 is a schematic diagram of another example of a fluidic network having an adjustable flow restriction device.

FIG. 10 is a schematic diagram of another example of a fluidic network having an adjustable flow restriction device 52. The network can be used to implement the configuration shown in FIG. 4 and includes a rotary valve 53 and injection valve 54. The injection valve 54 is similarly configured as the injection valve of FIG. 9 and corresponds to the valve 24 of FIG. 4. The serial arrangement of the first fluidic tee 51 and the adjustable flow restriction device 52 corresponds to the splitter 42 of FIG. 4.

In the illustrated network, one outlet of the fluidic tee 51 is coupled to port 53-1 of valve 53. The outlet port 53-7 of valve 53 is coupled to port 54-6 of the injection valve 54. A first combiner 44A has one inlet coupled to a second outlet of the fluidic tee 51 and a second inlet to receive a flow of strong solvent from Pump B. A second combiner 44B has a first inlet coupled to port 54-5 of the injection valve 54, a second inlet coupled to the outlet of the first combiner 44A and an outlet coupled to the chromatographic column. In this arrangement, a split portion of the flow of weak solvent from Pump A is used to push the sample stored in the sample loop 62 from the injection valve 54 where the sample is then diluted with a mixture of the strong solvent from Pump B and the other split portion of the flow of weak solvent.

Figure 11:
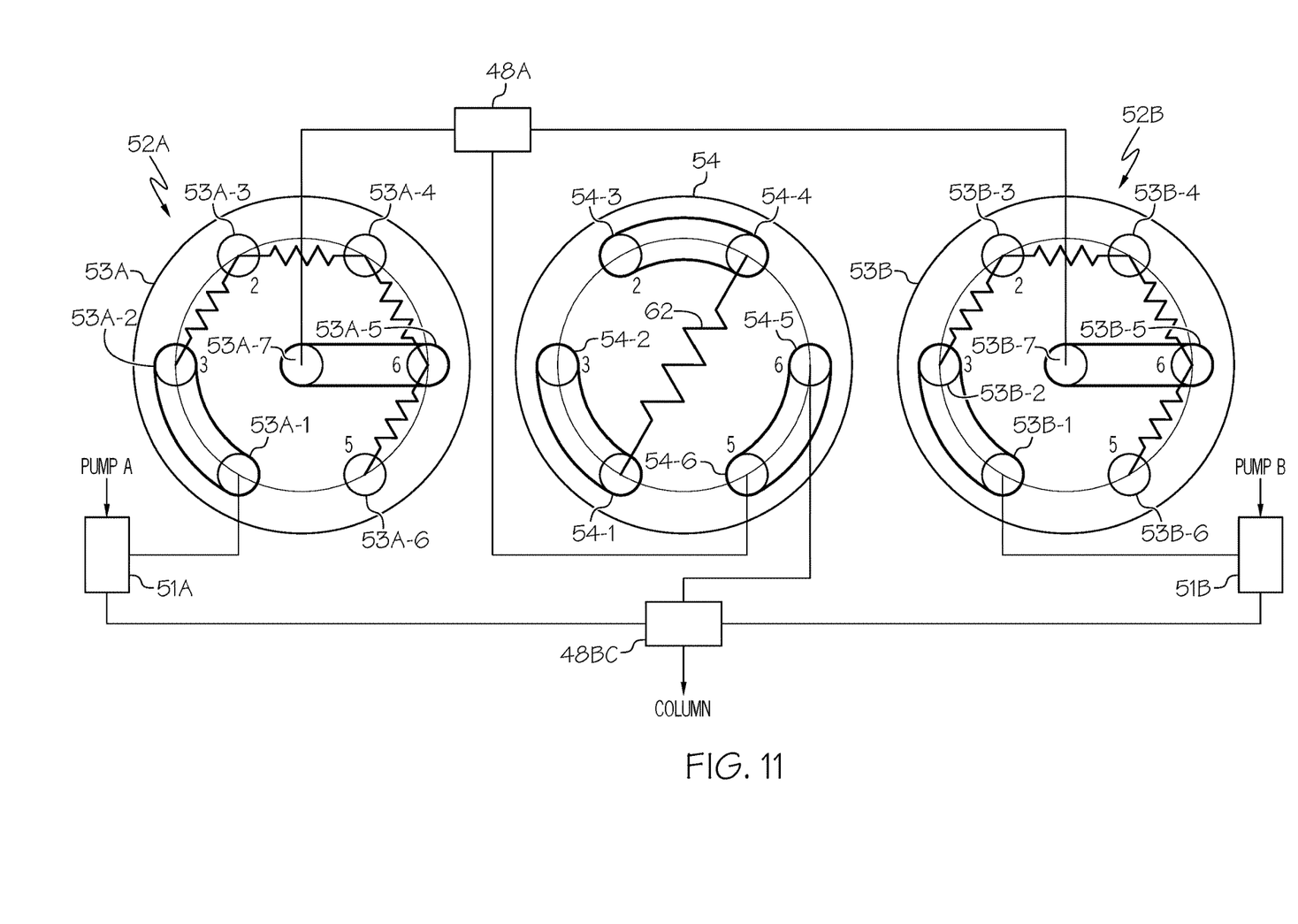
FIG. 11 is a schematic diagram of an example of a fluidic network having two adjustable flow restriction devices.

FIG. 11 is a schematic diagram of an example of a fluidic network having two adjustable flow restriction devices 52A and 52B. The network can be used to implement the configuration shown in FIG. 5 and includes two rotary valves 53A and 53B and an injection valve 54. The injection valve 54 is similarly configured as the injection valve of FIG. 9 and corresponds to the valve 24 of FIG. 5.

A first serial arrangement of a first fluidic tee 51A and an adjustable flow restriction device 52A and a second serial arrangement of a second fluidic tee 51B and an adjustable flow restriction device 52B correspond to the splitter 46A and the splitter 46B of FIG. 5.

One outlet of the first fluidic tee 51A is coupled to port 53A-1 of valve 53A. The outlet port 53A-7 of valve 53A is coupled to one of the inlets of a first combiner 48A. One outlet of the second fluidic tee 51B is coupled to port 53B-1 of valve 53B and the outlet port 53B-7 of valve 53B is coupled to the other inlet of the first combiner 48A. Ports 54-6 and 54-5 of the injection valve 54 are coupled to the outlet of the first combiner 48A and an inlet of a second combiner 48BC. It will be recognized that the second combiner 48BC corresponds to a single combiner having three inlet ports and is an alternative to the combination of the two separate combiners 48B and 48C in FIG. 5. The second outlets of the fluidic tees 51A and 51B are coupled to a second inlet and a third inlet, respectively, of the second combiner 48BC. The outlet of the second combiner 48BC is coupled to a chromatographic column. In this arrangement, a portion of the flow of the weak solvent from Pump A and a portion of the flow of the weak solvent from Pump B are mixed at the first combiner 48A and used to push the sample stored in the sample loop 62 from the injection valve 54. The other portion of the flow of the weak solvent from Pump A and the other portion of the flow of the weak solvent from Pump B are used to dilute the sample plug in the flow from the injection valve 54 at the second combiner 48BC.

While the invention has been shown and described with reference to specific embodiments, it should be understood by those skilled in the art that various changes in form and detail may be made therein without departing from the scope of the invention as recited in the accompanying claims.

What is claimed is:

1. A selectable flow restriction device comprising:
    a restriction valve having a first port, a second port, a plurality of fluidic nodes and a movable valve channel having a first end fluidically coupled to the second port and having a second end configured to couple to a selected one of the fluidic nodes, wherein one of the first and second ports is an inlet port and the other of the first and second ports is an outlet port; and
    a plurality of flow restrictors, each flow restrictor having a first end coupled to one of the fluidic nodes and a second end to another one of the fluidic nodes, the flow restrictors arranged to form a serial path defined from a first one of the flow restrictors to a last one of the flow restrictors, wherein a fluidic path to conduct a liquid is defined between the first port and the second port and wherein the flow restrictors included in the fluidic path are determined according to which one of the fluidic nodes is coupled to the second port.

2. The selectable flow restriction device of claim 1 wherein each of the flow restrictors includes a fluidic channel having a diameter that is different from the diameter of each of the other fluidic channels of the other flow restrictors.

3. The selectable flow restriction device of claim 1 wherein each of the flow restrictors includes a fluidic channel having a cross-sectional area that is different from the cross-sectional area of each of the other fluidic channels of the other flow restrictors.

4. The selectable flow restriction device of claim 1 wherein the restriction valve is a rotary valve.

5. The selectable flow restriction device of claim 1 wherein each fluidic node is an external port.

6. The selectable flow restriction device of claim 1 wherein each fluidic node is an internal node and wherein each flow restrictor is a fluidic channel formed inside the restriction valve between two of the fluidic nodes.

7. A fluidic network for chromatographic sample dilution during injection, comprising:
    a restriction valve having a first port, a second port, a plurality of fluidic nodes, and a movable valve channel having a first end fluidically coupled to the second port and having a second end configured to couple to a selected one of the fluidic nodes, wherein one of the first and second ports is an inlet port and the other one of the first and second ports is an outlet port;
    a plurality of flow restrictors, each flow restrictor having a first end coupled to one of the fluidic nodes and a second end to another one of the fluidic nodes, the flow restrictors arranged to form a serial path defined from a first one of the flow restrictors to a last one of the flow restrictors, wherein a fluidic path to conduct a liquid is defined between the first port and the second port and wherein the flow restrictors in the fluidic path are determined according to which one of the fluidic nodes is coupled to the second port;
    an injection valve having a plurality of injection valve ports, wherein one of the injection valve ports is an inlet port and another one of the injection valve ports is an outlet port, wherein the outlet port of the restriction valve is in fluidic communication with the inlet port of the injection valve;
    a first flow splitter comprising an inlet port, a first outlet port in fluidic communication with the inlet port of the restriction valve, and a second outlet port; and
    a first flow combiner having a first inlet port coupled to the second outlet port of the first flow splitter, a second inlet port, and an outlet port.

8. The fluidic network of claim 7 further comprising a second flow combiner having a first inlet port coupled to the outlet port of the restriction valve, a second inlet port, and an outlet port coupled to the inlet port of the injection valve, and wherein the second inlet port of the first combiner is coupled to the outlet port of the injection valve.

9. The fluidic network of claim 7 further comprising a second flow combiner having a first inlet port coupled to the outlet port of the first flow combiner, a second inlet port coupled to the outlet port of the injection valve, and an outlet port.

10. The fluidic network of claim 7 wherein the restriction valve is a first restriction valve and the plurality of restrictors is a plurality of first flow restrictors, the fluidic network further comprising:
    a second restriction valve having a first port, a second port, a plurality of fluidic nodes, and a movable valve channel having a first end fluidically coupled to the second port and having a second end configured to couple to a selected one of the fluidic nodes, wherein one of the first and second ports is an inlet port and the other one of the first and second ports is an outlet port;
    a plurality of second flow restrictors, each second flow restrictor having a first end coupled to one of the fluidic nodes in the second restriction valve and a second end to another one of the fluidic nodes in the second restriction valve, the second flow restrictors arranged to form a serial path defined from a first one of the second flow restrictors to a last one of the second flow restrictors, wherein a fluidic path to conduct a liquid is defined between the first port and the second port of the second restriction valve through at least one of the second flow restrictors and wherein the second flow restrictors in the fluidic path are determined according to which one of the fluidic nodes is coupled to the second port of the second restriction valve;

a second flow combiner having a first inlet port coupled to the outlet port of the first restriction valve, a second inlet port coupled to the outlet port of the second restriction valve, and an outlet port coupled to the inlet port of the injection valve; and a second flow splitter having an inlet port, a first outlet port coupled to the inlet port of the second restriction valve, and a second outlet port coupled to the second inlet port of the first combiner.

11. The fluidic network of claim 7 further comprising a sample loop having a first end coupled to one of the valve ports of the injection valve and a second end coupled to another one of the valve ports of the injection valve.

12. The fluidic network of claim 8 further comprising a chromatographic column having an inlet port in fluidic communication with the outlet port of the first flow combiner.

13. The fluidic network of claim 9 further comprising a chromatographic column having an inlet port in fluidic communication with the outlet port of the second flow combiner.

14. The fluidic network of claim 10 further comprising a chromatographic column having an inlet port in fluidic communication with the outlet port of the first flow combiner.

* * * * *